Sept. 22, 1942.  K. E. COPPOCK  2,296,628
ARM REST
Filed April 17, 1941

Inventor
Kenneth E. Coppock
By Blackmore, Lucas & Flint
Attorneys

Patented Sept. 22, 1942

2,296,628

UNITED STATES PATENT OFFICE 2,296,628

ARM REST

Kenneth E. Coppock, Pleasant Ridge, Mich., assignor to General Motors Corporation, Detroit, Mich., a corporation of Delaware Application April 17, 1941, Serial No. 388,938

2 Claims. (Cl. 155—198)

This invention relates to portable arm rests adapted to be removably applied to the seats of an automotive vehicle.

Some automotive vehicle seats, particularly the front seat, are not equipped with a foldable arm rest at the middle of the seat such as is frequently applied to the rear seat of the vehicle. It is at times desirable to have an arm rest, and the object of the present invention is to construct a foldable or collapsible and removable arm rest which is capable of being applied to front or rear vehicle seats when they are not equipped with a built-in arm rest.

The arm rest itself comprises a hollow shank member extending in parallelism with the back of the seat and having a socket at its lower end projecting under the lower edge of the seat back. A tine rigidly secured to the seat is adapted to be received in the socket and hold the shank in place. The top of the shank has a bracket secured thereto, to which there is pivoted a second bracket having the arm rest mounted thereon. The arm rest is capable of being swung from a position parallel with the seat back into a horizontal position over the seat cushion to serve as an arm rest for the driver or passenger. The bracket of the shank is provided with an adjusting screw to limit the downward movement of the arm.

On the drawing

Figure 1:
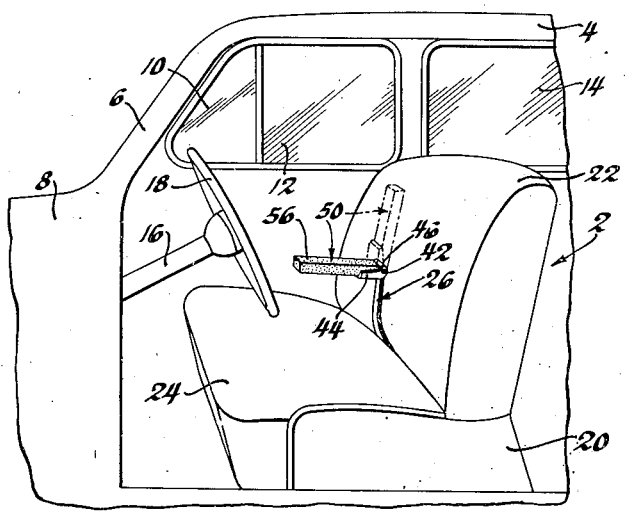
Figure 1 is a view of the part of an automobile with the door removed and showing the invention applied.

Referring to the drawing, the numeral 2 indicates an automotive vehicle as a whole. This vehicle has the usual top 4, windshield post 6 and cowl 8. The side of the vehicle has the ventilating window 10 and the usual raisable and lowerable front and rear windows 12 and 14, respectively. The steering mast is shown at 16 with the steering wheel 18 mounted in the end thereof for turnable movement to steer the vehicle. The vehicle is provided with the usual seat 20 having a seat back 22 and a seat cushion 24.

The arm rest of the invention is indicated as a whole at 26 and it is shown in its application to a seat in the figures of the drawing.

Figure 2:
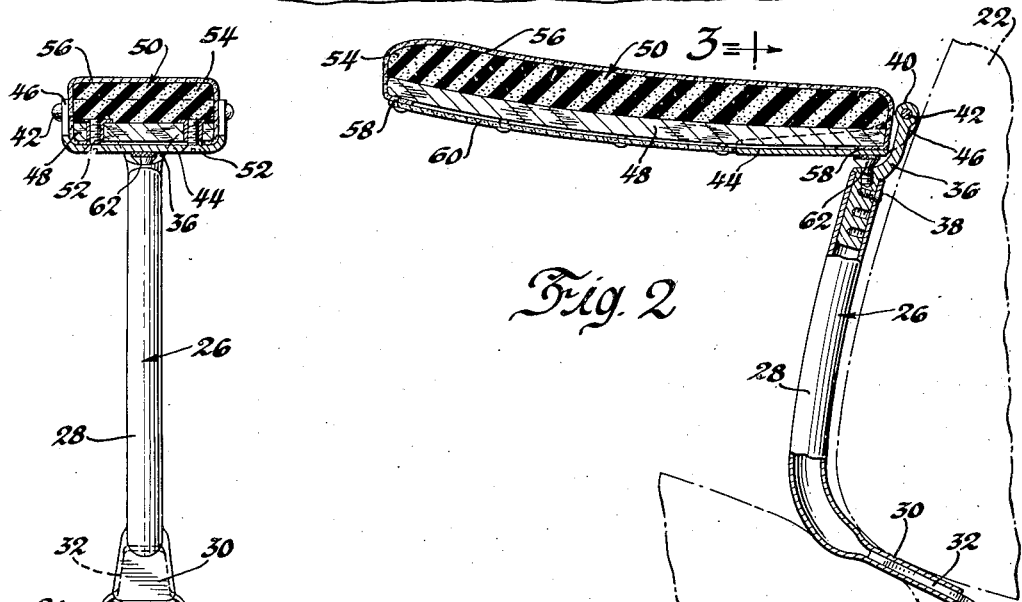
Figure 2 is an enlarged sectional detailed view through the middle of the arm rest in its position of use.

The arm rest 26 comprises the hollow upright or shank part 28 which is shaped generally to conform to the shape of the seat back 22 as is best shown in Figure 2. The lower end of the shank 28 is flattened to form a socket 30 in which there is received the tine 32 of a gooseneck member 33 secured to the frame of the seat 20 by means of the fastening devices 34.

A bracket 36 is mounted in the top of the shank part 28 and secured thereto by means of the screws 38. This bracket 36 ends in an eye 40 in which there is received the pivot pin 42. A second bracket 44 has ears 46 which are received on opposite sides of the eye 40 and receive the ends of the pivot pin 42 hingedly to mount the bracket 44 on the bracket 36. The hinged connection is preferably a tight one having considerable friction to overcome in moving from one of its positions to the other.

Figure 3:
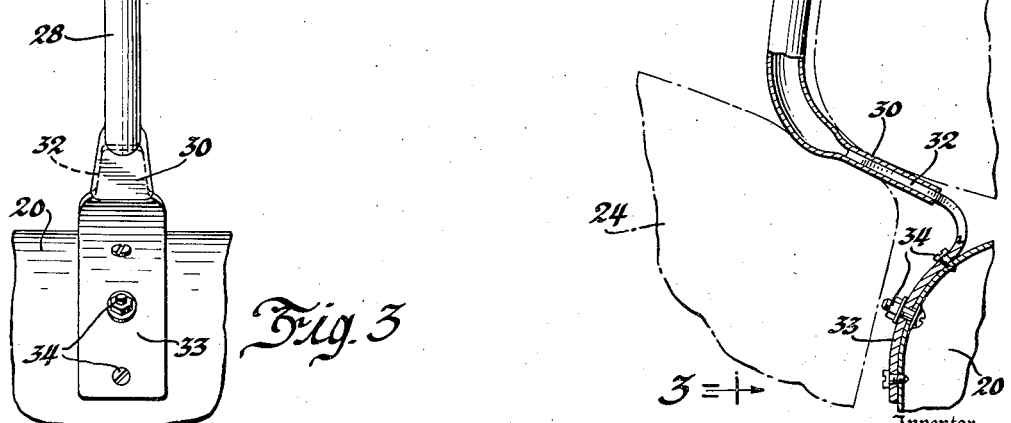
Figure 3 is a section on the line 3—3 of Figure 2.

The bracket 44 is more or less channel-shaped and has mounted in the channel the wooden undersupport 48 of an arm indicated as a whole at 50. The wooden support 48 is secured to the arm 44 by means of the fastening devices 52 as shown in Figure 3. On the wooden support 48 a rubber padding 54 is preferably mounted. This padding may be of any suitable type of rubber, or if desired, any other type of padding or upholstering may be used. Over the rubber 54 a covering or finish strip 56 is secured. The ends of the covering 56 are inturned as shown at 58 under the wooden support 48. A lower finishing strip 60 is applied to the bottom of the arm 50.

Referring to Figure 1, the inoperative position of the arm rest is shown in the dotted outline at 50, while the operative position is shown in the full outline at 50. If the occupant of the vehicle desires to remove the arm rest entirely, this may be done by grasping the shank part 28 and pulling the socket 30 away from the tine 32. The arm rest may now be stored in the rear compartment of the vehicle or at any other desirable place.

In order to limit the downward movement of the arm 50 and to assure that it is in the proper position to serve as an arm rest, an adjusting or limiting screw 62 is screw threaded into the bracket 36. The lower side of the bracket 44 contacts with the head of the screw 62 when the arm is in the lower position as shown in Figure 2. By turning the screw 62 inwardly or outwardly the position of the arm at 50 may be adjusted.

I claim:

1. In an arm rest adapted to be attached to the seat of an automotive vehicle, a retainer attached to the seat, said retainer having a tine, a socket on the arm rest capable of being removably received over the tine to hold the arm rest in position, said arm rest having an upwardly extending hollow shank portion shaped to fit against the seat back, a bracket mounted in the top of the shank portion, an arm hinged to the bracket, said arm capable of being swung outwardly and away from the seat back into substantially parallelism with the seat cushion to form an arm rest, and means on the bracket to limit the outward movement of the arm.

2. In an arm rest adapted to be attached to the seat of an automotive vehicle, a retainer attached to the seat, said retainer having a gooseneck shaped tine projecting between the bottom of the seat back and the end of the seat cushion, a socket on the end of the arm rest capable of being removably received over the tine to hold the arm rest in position, said arm rest having an upwardly extending hollow shank portion forming a continuation of the socket and shaped to fit against the seat back, a bracket secured in the end of the shank portion, a second bracket hinged to the first bracket, an arm secured to the second bracket, said arm capable of being swung outwardly and away from the seat back into substantially parallelism with the seat cushion to form an arm rest, and means on the first bracket to limit the outward movement of the arm.

KENNETH E. COPPOCK.